(12) United States Patent
Hyder et al.

(10) Patent No.: US 12,470,595 B2
(45) Date of Patent: Nov. 11, 2025

(54) CLOUD RANSOMWARE PROTECTION

(71) Applicant: Malwarebytes Corporate Holdco Inc., Santa Clara, CA (US)

(72) Inventors: Adam S. Hyder, Cupertino, CA (US); Raghuram Sri Sivalanka, San Ramon, CA (US); Atanu Podder, Dublin, CA (US); Thomas R. Gissel, Apex, NC (US); Brian P. Morehead, Manteca, CA (US)

(73) Assignee: Malwarebytes Corporate Holdco Inc., Santa Clara, CA (US)

( * ) Notice: Subject to any disclaimer, the term of this patent is extended or adjusted under 35 U.S.C. 154(b) by 262 days.

(21) Appl. No.: 18/301,145

(22) Filed: Apr. 14, 2023

(65) Prior Publication Data

US 2024/0259424 A1  Aug. 1, 2024

(30) Foreign Application Priority Data

Jan. 31, 2023 (IN) .............................. 202341006339

(51) Int. Cl.
*H04L 9/40* (2022.01)
*G06F 21/60* (2013.01)
*G06F 21/62* (2013.01)

(52) U.S. Cl.
CPC ........ *H04L 63/1466* (2013.01); *G06F 21/604* (2013.01); *G06F 21/6218* (2013.01); *H04L 63/1416* (2013.01); *H04L 63/1441* (2013.01)

(58) Field of Classification Search
CPC ............. H04L 63/1466; H04L 63/1416; H04L 63/1441; G06F 21/604; G06F 21/6218
See application file for complete search history.

(56) References Cited

U.S. PATENT DOCUMENTS

| | | | | |
|---|---|---|---|---|
| 11,687,652 | B1* | 6/2023 | Pinheiro | G06F 21/564 |
| | | | | 726/23 |
| 11,757,975 | B1* | 9/2023 | Pandey | G06F 21/565 |
| | | | | 709/219 |
| 2013/0086683 | A1* | 4/2013 | Thomas | G06F 21/568 |
| | | | | 726/24 |
| 2016/0294851 | A1* | 10/2016 | Langton | G06F 21/566 |
| 2017/0093897 | A1* | 3/2017 | Cochin | H04L 63/145 |
| 2017/0235945 | A1* | 8/2017 | Lee | G06F 21/52 |
| | | | | 726/23 |
| 2018/0248896 | A1* | 8/2018 | Challita | G06F 21/554 |
| 2019/0303573 | A1* | 10/2019 | Chelarescu | G06F 16/16 |
| 2019/0306179 | A1* | 10/2019 | Chelarescu | H04L 63/0428 |
| 2020/0034537 | A1* | 1/2020 | Chen | G06F 16/128 |
| 2021/0152595 | A1* | 5/2021 | Hansen | G06F 21/568 |
| 2021/0357504 | A1* | 11/2021 | Saad | G06F 21/567 |

(Continued)

*Primary Examiner* — Mohamed A. Wasel
(74) *Attorney, Agent, or Firm* — Fenwick & West LLP (57) ABSTRACT

A newly created or modified object is sent to a networked local or remote server for analysis. While the object is being analyzed for vulnerabilities, the object is locked and made inaccessible to users, devices, and networks. If the object is identified as malicious, it may be marked for review, deleted, placed in quarantine, or have its permissions changed so that it cannot cause harm by propagating through the environment. Conversely, if the object is identified as safe, the risk of ransomware attacks may also be mitigated by replicating the object across multiple cloud storage platforms.

17 Claims, 5 Drawing Sheets

(56) References Cited

U.S. PATENT DOCUMENTS

| | | | |
|---|---|---|---|
| 2023/0078476 A1* | 3/2023 | Venkatachalam | G06F 21/566 |
| | | | 726/24 |
| 2023/0247003 A1* | 8/2023 | Chanak | H04L 9/3226 |
| | | | 726/1 |
| 2023/0291763 A1* | 9/2023 | Soryal | H04L 63/1425 |
| 2024/0004993 A1* | 1/2024 | Rozenberg | G06F 21/554 |

* cited by examiner

CLOUD RANSOMWARE PROTECTION

CROSS-REFERENCE TO RELATED APPLICATION

This application claims the benefit of Indian Patent Application No. 202341006339, filed Jan. 31, 2023, which is incorporated by reference.

FIELD OF ART

The present disclosure relates generally to cloud storage and, more specifically, to detecting and handling malicious objects in a cloud storage environment.

BACKGROUND

Users in an organization, can store, modify, and move files and objects within and between cloud storages. Consequently, a storage object can be easily moved from a non-target system or network to a target system or network leaving a door wide open for exploiting vulnerabilities. This stems from the fact that most security systems are designed to check for vulnerabilities in a local file or an object formatted for the device the security system is running on. Thus, the security system of the non-target network or system may determine that a file or object is "safe" and then the file or object may be moved within the cloud to a target system or network for which the file or object is not safe.

SUMMARY

The above and other problems may be addressed by a cloud storage security system that scans and analyzes incoming and/or stored objects to identify vulnerabilities and threats. In various embodiments, the cloud storage security system can track changes across multiple storage systems, detect vulnerabilities, track detected vulnerabilities, allow access to only verified and good objects, detect behavioral anomalies in a secure isolated system, notify users of such anomalous/malicious objects, and/or take proactive actions to prevent damage.

In one embodiment, an incoming and/or stored object is sent to a networked local or remote server for analysis. While the object is being analyzed for vulnerabilities, the object is locked and made inaccessible to users, devices, and networks. If the object is identified as malicious, it may be marked for review, placed in quarantine, and/or have its permissions changed so that it cannot harm the environment by propagating through local storages, cloud storages, corporate networks, cloud networks, and cloud workloads, etc.

Additionally or alternatively, the cloud storage security system may also protect against ransomware attacks by encrypting and storing objects identified as valuable in a secure location. The encrypted objects may be stored securely by making copies across multiple storage locations (e.g., using different operating systems or protocols, etc.). Thus, even if one storage location is compromised by ransomware, the valuable objects are likely to remain accessible from a different storage location that may not be vulnerable to the ransomware attack.

DETAILED DESCRIPTION

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Configuration Overview

Figure 1:
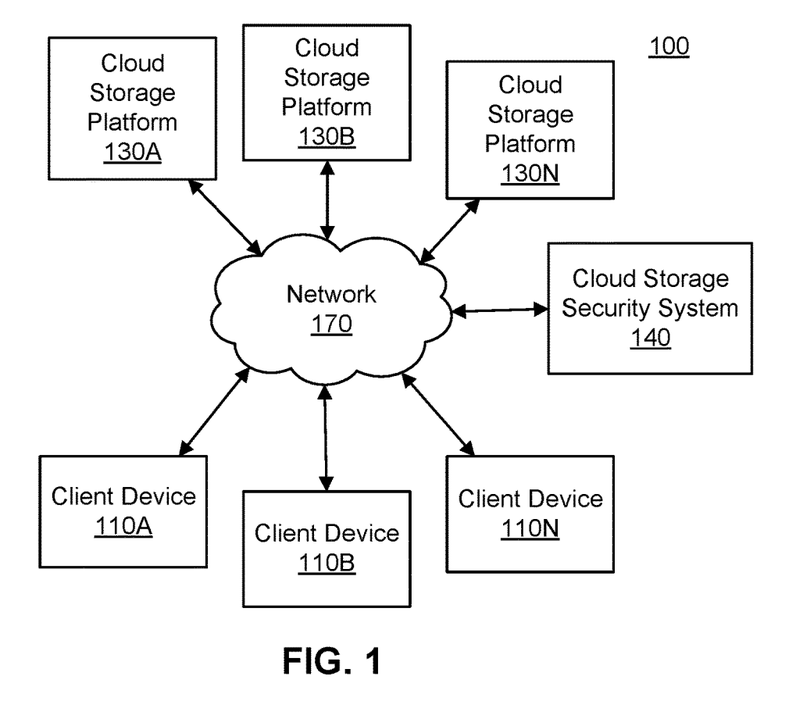
FIG. 1 is a block diagram of a networked computing environment suitable for providing security scanning of cloud storage objects, according to an embodiment.

FIG. 1 illustrates one embodiment of a networked computing environment 100 suitable for providing security scanning of cloud storage objects. In the embodiment shown, the networked computing environment 100 includes one or more client devices 110A-N, one or more cloud storage platforms 130A-N, and a cloud storage security system 140, all connected via a network 170. For simplicity and clarity, only three client devices 110 (a first client device 110A, a second client device 110B, and an Nth client device 110N), three cloud storage platforms 130 (a first cloud storage platform 130A, a second cloud storage platform 130B, and an Nth cloud storage platform 130N), and one cloud storage security system 140 are shown, but in practice the networked computing environment may include any number of each element. In other embodiments, the networked computing environment 100 includes different or additional elements. In addition, the functions may be distributed among the elements in a different manner than described. For example, the cloud storage security system 140 may also be a cloud storage platform 130. As another example, although the cloud storage security system is shown as a single entity, the corresponding functionality may be provided by multiple systems operating together.

A client device 110 may be any computing device with which a user may submit a new cloud storage object or a change to a preexisting cloud storage object for storage in a cloud storage platform 130. For example, an enterprise may provide employees with cloud storage via one or more cloud storage platforms 130 and the employees may save files, executables, and/or other objects (collectively cloud storage objects) to the cloud storage platform 130. The client device 110 may also be used to submit changes to preexisting cloud storage objects and download cloud storage objects for local use. The client device 110 may interact with the cloud storage platform 110 using any suitable means, such as a web-based interface accessed via a web browser, a dedicated cloud storage application, or an API that is called using other applications.

A cloud storage platform 130 includes one or more computing devices that provide storage of cloud storage objects that may then be accessed and modified by client devices 110 via the network 170. Different cloud storage platforms 130 may be provided by different service providers. Different cloud storage platforms 130 may also use different protocols, operating systems, and infrastructures. Thus, a malicious storage object that may be a security threat to one cloud storage platform (e.g., cloud storage platform 130A) may not present a risk to another cloud storage platform (e.g., cloud storage platform 130B).

On receiving new cloud storage objects or changes to preexisting cloud storage objects, the cloud storage platforms 130 generate events that are sent to the cloud storage security system 140. An event is a data object that contains information describing the change to the stored data in the cloud storage platform (e.g., the creation, modification, or deletion of a cloud storage object). The information contained in an event may include an identifier of the cloud storage object changed, a type of the cloud storage object, an owner of the cloud storage object, a total size of the cloud storage object, a size of the change, a source of the change, and/or any other metadata describing the change to the cloud storage object. In one embodiment, the cloud storage platform 130 locks the data storage object when an event is created until it receives a response from the cloud storage security system 140. Alternatively, the cloud storage platform may only lock the data storage object on receipt of a response to the event indicating that the cloud storage security system 140 is scanning the data storage object.

The cloud storage security system 140 includes one or more computing devices that scan data storage objects for security threats. In one embodiment, the cloud storage security system 140 analyze events to determine whether to scan the corresponding data storage object. Assuming the cloud storage security system 140 determines that the data storage object should be scanned, the cloud storage security system 140 downloads a copy of the data storage object and scans it with a platform-agnostic scanner. The cloud storage security system 140 responds to the events with an indication of one or more security actions to take. For example, if the data storage object is determined to be safe, the security action may be to unlock the data storage object (which was previously locked while the scan was conducted). Conversely, if a threat is detected (e.g., malware or other potentially malicious code), the security action may include deleting, quarantining, or otherwise preventing access to the data storage object. Various embodiments of the cloud storage security system 140 are described in greater detail below with reference to FIG. 2.

The network 170 provides the communication channels via which the other elements of the networked computing environment 100 communicate. The network 170 can include any combination of local area and wide area networks, using wired or wireless communication systems. In one embodiment, the network 170 uses standard communications technologies and protocols. For example, the network 170 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, some or all of the communication links of the network 170 may be encrypted using any suitable technique or techniques.

Example Systems

Figure 2:
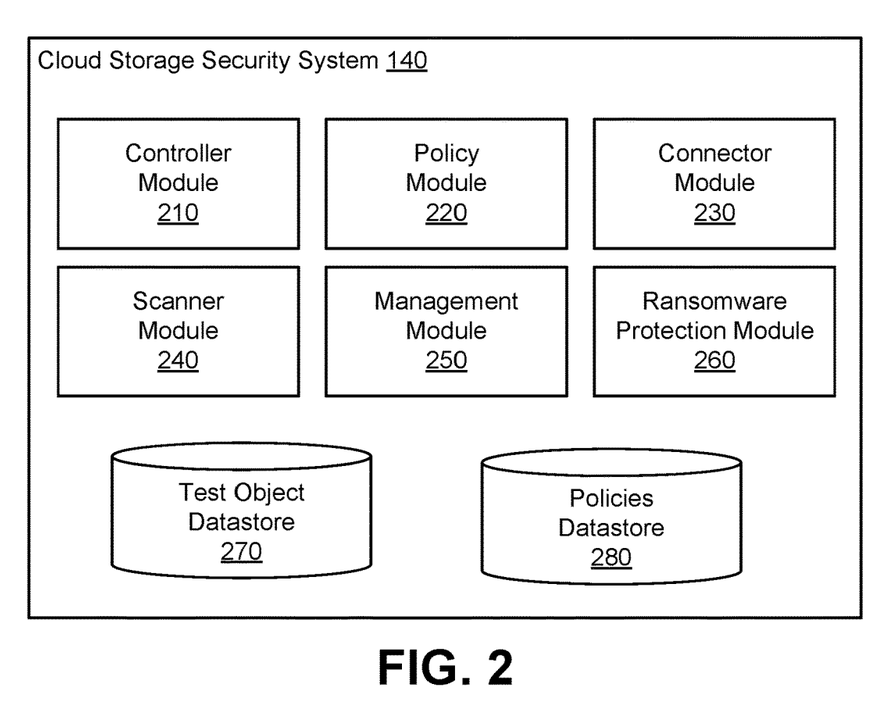
FIG. 2 is a block diagram of the cloud storage security system of FIG. 1, according, according to an embodiment.

FIG. 2 illustrates one embodiment of the cloud storage security system 140. In the embodiment shown, the cloud storage security system 120 includes a controller module 210, a policy module 220, a connector module 230, a scanner module 240, a management module 250, a ransomware protection module 260, a test object datastore 270, and a policies datastore 280. In other embodiments, the cloud storage security system 120 includes different or additional components. Furthermore, the functionality may be distributed between the components differently than described. For example, in some embodiments, the policy module 220 may be located in the cloud storage platforms 130 and send objects to be scanned to the cloud storage security system 140.

The controller module 210 interacts with the other modules to provide cloud storage scanning and/or ransomware protection. In one embodiment, the controller module 210 interacts with the policy module 220 to identify one or more objects to monitor from one or more cloud storage platforms. The controller module 210 uses the connector module 230 to communicate with the relevant cloud storage platform(s) 130 to identify when to scan monitored objects (e.g., in response to a change in a monitored object). When a change in a monitored object is reported, the controller module 210 may also receive metrics such as the rate of the change, the size of the change, the source and the pattern of the change, etc. This information may enable the controller module 210 to operate at an aggregated level of changes that considers changes occurring on multiple cloud storage platforms 130.

The controller module 210 may use the scanner module 240 to evaluate if a monitored object is safe or unsafe after a change. If the object is determined as unsafe, the controller module 210 may trigger one or more security actions, such as quarantining, locking, or deleting the object to prevent access to the object across all cloud storage providers 130. The controller module 210 may also discern if a security action corresponds to a severe or non-serious threat and generate a notification accordingly (e.g., by sending an email, instant message, push notification, or other message explaining the threat and/or security action taken to a client device 130 for display to a user). In contrast, if the change evaluates to safe, the controller module 210 may signal the ransomware protection module 260 to secure the object against ransomware threats.

The policy module 220 manages policies that determine what objects to scan, where the scans should happen, and/or how ransomware protection will be applied. In one embodiment, the policy module 220 provides a user interface (e.g., to client devices 130) with which a user can define and edit policies. A policy may define whether objects are scanned based on one or more attributes of the storage object, such as size, frequency of access, total number of accesses, time since last use, frequency of edits, source, storage location, etc. The policy may also define how a threat is handled if detected (e.g., whether a threat of a given type results in the corresponding object being quarantined or deleted, or just the issuance of a warning, etc.).

In some embodiments, a policy includes rules (which may also be based on the object attributes as well as other factors, such as a user-designated importance score) that identify the relative significance of different objects for ransomware protection. These rules may govern whether the ransomware protection module 260 protects an object or not such that it replicates only the objects that are identified as business-critical. For example, a rule may calculate a significance score for an object with the policy module 220 providing an identifier of the object to the ransomware protection module 260 if the significance score exceeds a threshold. Alternatively, a policy may just include a list of objects to be provided to the ransomware protection module 260 for protection. Regardless, a policy may also a define where to securely store copies of objects for ransomware protection and how many copies to store. For example, the most important objects may be reproduced across all cloud storage platforms 130, with potentially multiple copies on each platform, while objects of medium importance may be copied to a single backup platform, while low-importance objects may not be copied to any additional cloud storage platforms.

The connector module 230 manages communications between the cloud storage security system 140 and the cloud storage platforms 130. The connector module 230 may connect to cloud storage platforms 130 to identify and fetch objects to be protected. The connector module 230 may also send instructions to implement security actions for objects to the cloud storage platforms 130.

In one embodiment, the connector module 230 receives events from the cloud storage platforms 130. A cloud storage platform 130 may generate an event when a change occurs regarding the objects it is storing (e.g. object creation, object deletion, object modification, etc.). The event is a data object that includes a payload. The payload may include an identifier of the object that triggered the event and information describing the current state of the object (e.g., the content or changes to the content stored in the object). The connector module 230 may provide the event payload to the controller module 210 to determine whether the corresponding object should be scanned and wait asynchronously for an indication that one or more security actions should be performed in response to the event. For example, the controller module 210 may identify a policy that applies to the object using the identifier of the object and apply the policy to attributes of the object to determine whether it should be scanned under the policy.

If the connector module 230 receives an indication that one or more security actions should be performed, it sends instructions for performing those security actions to the appropriate cloud storage platform(s) 130. The security actions may include deleting the object, quarantining the object, suspending read/write operations for the object, and/or disabling access to the cloud storage platform 130 (or a portion thereof).

The scanner module 240 downloads and scans objects that the controller module 210 determines should be scanned based on received events. Although the scanner module 240 is shown as a single entity, the cloud storage security system 140 can contain multiple scanners, distributed across multiple computing devices to provide sufficient capacity to timely-scan any objects identified for scanning. The scanners may be distributed across various networking topologies, such as an on-premise compute configuration, a cloud-agnostic compute configuration, or a customer-owned private network, etc.

Scanner instances may receive instructions to scan an object (e.g., from the controller module 210), download the object from the appropriate cloud storage platform 130, and scan the object for threats. The cloud storage platform 130 may be instructed to lock access to the object until the scan is complete. On completion of the scan, the scanner may forward the results to the controller module 210 so it can take appropriate action (e.g., instructing the corresponding cloud storage platform 130 to take one or more security actions and/or generating a notification to a user associated with the object). In one embodiment, a scanner uses a platform agnostic malware agent capable of detecting malware targeted at any host to scan objects for threats. This may allow the separation of the runtime of the agent from the target platform of the malware. For example, a scanner may use one or more of a cost-optimized device, virtual machine, or cloud container to analyze an object irrespective of the target operating system of the object.

The scanner module 240 may also ensure network connectivity between scanners and the rest of the cloud storage security system 140 while addressing varying data privacy requirements and regulations. For example, the scanner may be the only part of the cloud storage security system 140 that accesses the content of data objects that are scanned, with the remaining components acting on events or other metadata indicating that changes have occurred in the stored data without providing access to the stored data itself. To this end, the scanners may be isolated from the rest of the cloud storage security system 140 (e.g., by being executed on dedicated computing devices behind their own firewalls, etc.).

The management module 250 manages the distribution of scanning tasks between scanners. In one embodiment, the management module 250 monitors the activities of all of the scanner instances provided by the scanner module 240. The management module 250 attempts to optimize scanner usage by distributing scanning tasks to minimize the idle time of each scanner. To this end, the management module 250 records actions of the scanner instances, such as data traffic, network traffic, interaction and access to internal and external resources, CPU usage, memory usage, and disk usage, etc. Thus, new scanning jobs can be assigned to scanner instances that are either free to start working immediately on a new scanning job or are close to completing a current scanning job. In some embodiments, the management module 250 may predict demand for scanning jobs based on historical information regarding scanning jobs performed by the scanners (e.g., an expected number of scanning jobs based on the time of day, day of the week, proximity to holidays, etc.) and proactively add scanner functionality (e.g., by bringing an additional scanner online). Similarly, in periods of low scanner demand, one or more scanner instances may be placed into an idle or offline state to reduce energy usage.

The ransomware protection module 260 replicates objects across multiple storage locations (e.g., two or more cloud storage platforms 130). In one embodiment, the ransomware protection module 260 receives a notification that a newly created or updated object has been scanned and determined to be threat-free. The ransomware protection module 260 determines whether the newly created or updated object is one that should be replicated (e.g., by comparing an identifier of the object to a list provided by the controller module 210) and, if so, replicates the clean object across a set of cloud storage locations. Thus, if one of the cloud storage locations is subject to a ransomware breach, the object is likely to be recoverable from a different cloud storage location. The ransomware protection module 260 may use encryption-at-rest protection for the object during copying of the object to different cloud storage locations to maintain data security.

As described previously, a policy my define two or more categories for whether and how objects are replicated to provide ransomware protection. In a simple embodiment, the policy identifies objects which should be replicated and the ransomware protection module 260 replicates those objects across a pre-defined (or policy-defined) set of cloud storage platforms 130. In a more complicated embodiment, a policy may classify objects into sensitivity categories (e.g., high, medium, and low sensitivity), with objects in a more sensitive category being replicated more broadly than objects in a less sensitive category. For example, high-sensitivity objects may be replicated across all available cloud storage platforms 130, medium-sensitivity objects may be replicated to a single additional cloud storage platform, and low-sensitivity objects may not be replicated at all.

The test object datastore 270 includes one or more non-transitory computer-readable media that store objects for scanning. In one embodiment, the scanner module 240 downloads a copy of an object to be tested to the test object datastore 270 and then scans the copy of the object in the test object datastore. The scanner module 240 may store the results on scans in conjunction with the corresponding test object (e.g., for future auditing or threat assessment). Although the test object datastore 270 is shown as a single entity, it may be distributed across multiple datastores. For example, each scanner may have its own datastore such that each scanner can access only data objects that it is assigned to test. Thus, the test objects can be isolated from the rest of the cloud storage security system 140.

The policies datastore 280 includes one or more non-transitory computer-readable media that store policies used by the cloud storage security system. In one embodiment, the policy module 220 saves a copy of policies defined by users (e.g., using a user interface of a client device 110) in the policies datastore. As described previously, the policies may define which objects in cloud storage platforms 130 are scanned for threats, how detected threats are handled, and/or which objects are replicated by the ransomware protection module 260.

Example Methods

Figure 3:
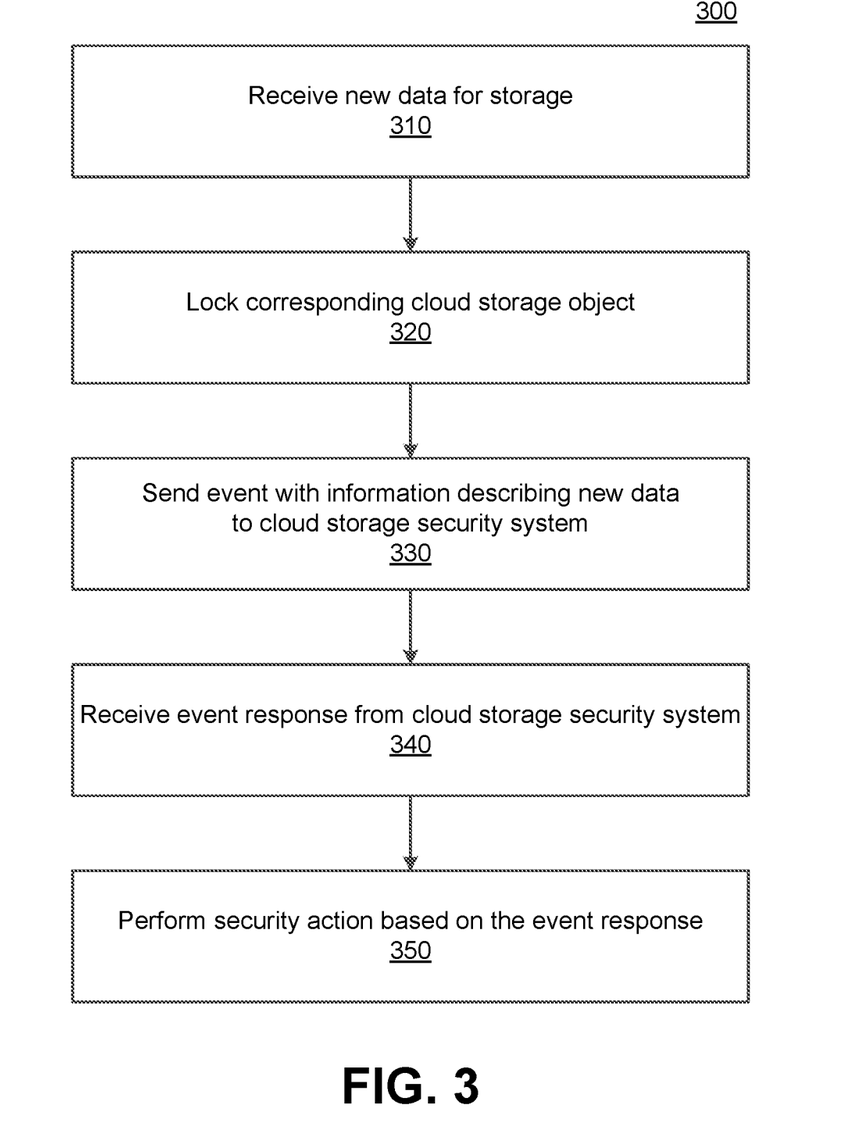
FIG. 3 is a flowchart illustrating an example process for performing a security action of a cloud storage object, according to an embodiment.

FIG. 3 illustrates an example method 300 for performing a security action of a cloud storage object, according to an embodiment. The steps of FIG. 3 are illustrated from the perspective of a cloud storage platform 130 performing the method 300. However, some or all of the steps may be performed by other entities or components. In addition, some embodiments may perform the steps in parallel, perform the steps in different orders, or perform different steps.

In the embodiment shown, the method 300 begins with the cloud storage platform 130 receiving 310 new data for storage. The new data may be a new data storage object or a change to a preexisting data storage object already stored by the cloud storage platform 130. The cloud storage platform 130 locks 320 the corresponding cloud storage object in which the new data is stored and sends 330 an event to the cloud storage security system 140. The event includes information describing the new data, such as an identifier of the corresponding cloud storage object and metrics relating to the change, such as a size of the change, a frequency with which the cloud storage object is changed, a source of the new data, etc.

As described previously, the cloud storage security system 140 processes the event and, if a relevant policy dictates, downloads a copy of the cloud storage object for scanning. The cloud storage platform 130 receives 340 an event response from the cloud storage security system 140. If the relevant policy indicated that the cloud storage object need not be scanned, the response may just indicate that no scan was required. Conversely, if the copy of the cloud storage object was scanned, the response includes an indication of the results of the scan.

The cloud storage platform 130 performs 350 a security action based on the event response. If no scan was performed or the scan results indicate that the cloud storage object is safe, the security action may be to unlock the cloud storage object. Conversely, if a threat was detected, the security action may include one or more of marking the data storage object for review, generating an alert, deleting the data storage object, quarantining the data storage object, changing access permissions for the data storage object, or otherwise preventing access to the data storage object.

Figure 4:
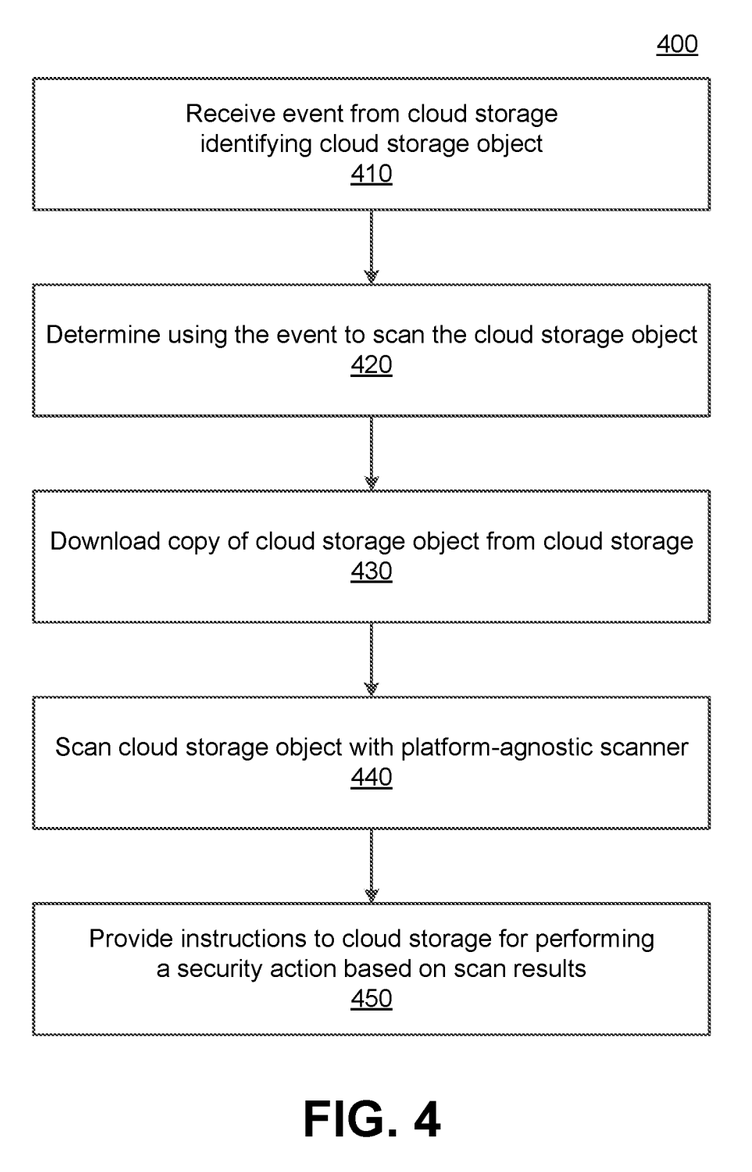
FIG. 4 is a flowchart illustrating an example process for providing a platform-agnostic security scan of a cloud storage object, according to an embodiment.

FIG. 4 illustrates an example method 400 for providing a platform-agnostic security scan of a cloud storage object, according to an embodiment. The steps of FIG. 4 are illustrated from the perspective of the cloud storage security system 140 performing the method 400. However, some or all of the steps may be performed by other entities or components. In addition, some embodiments may perform the steps in parallel, perform the steps in different orders, or perform different steps.

The event identifies a cloud storage object (e.g., an object that was recently created, modified, or deleted). Using the event, the cloud storage security system 140 determines 420 to scan the cloud storage object. For example, the cloud storage security system 140 may determine 420 to scan a cloud storage object if the event indicates the cloud storage object was newly created or changed and a policy indicates that the cloud storage object should be scanned. Conversely, if the event indicates the cloud storage object was deleted or the relevant policy indicates that it need not be scanned, the cloud storage security system 140 may take no further action.

Assuming that the cloud storage security system 140 determined 420 to scan the cloud storage object, the cloud storage security system 140 downloads 430 a copy of the cloud storage object from the cloud storage platform 130. The cloud storage system 140 scans 440 the cloud storage object for threats. The scan may be performed using a platform-agnostic scanner. Based on the scan results, the cloud storage security system 140 provides 440 instructions to the cloud storage platform to take a security action. For example, if a threat is detected, the cloud storage security system 140 may instruct the cloud storage platform 130 to quarantine, delete, or otherwise lock access to the cloud storage object. Thus, a threat that does not targeted the cloud storage platform 130 on which the cloud storage object is currently stored may be detected and prevented from spreading to other cloud storage platforms 130 that may be targeted by the threat.

Figure 5:
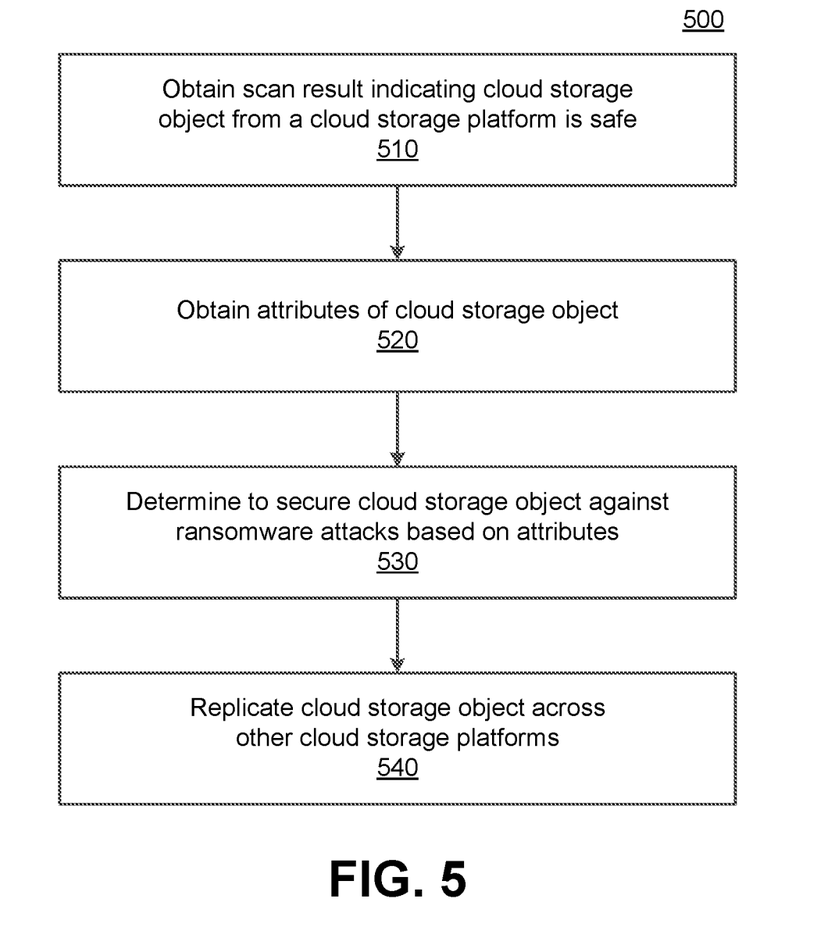
FIG. 5 is a flowchart illustrating an example process for providing ransomware protection for a cloud storage object, according to an embodiment.

FIG. 5 illustrates an example method 500 for providing ransomware protection for a cloud storage object, according to an embodiment. The steps of FIG. 5 are illustrated from the perspective of the malware protection module 260 performing the method 500. However, some or all of the steps may be performed by other entities or components. In addition, some embodiments may perform the steps in parallel, perform the steps in different orders, or perform different steps.

In the embodiment shown, the method 500 begins with the malware protection module 260 obtaining 510 a scan result indicating that a cloud storage object is safe. As described previously, the cloud storage objected that is scanned may be a copy of a corresponding cloud storage object stored at a cloud storage platform 130.

The malware protection module 260 obtains 520 attributes of the cloud storage object. The attributes may include one or more of a size, frequency of access, total number of accesses, time since last use, frequency of edits, source, or storage location, etc. Using the attributes, the malware protection module 260 determines 530 to secure the cloud storage object against ransomware attacks. For example, the attributes may be compared to a policy (e.g., as defined by the policy module 220) to determine whether to protect the object. Determining 530 whether to secure the object may include calculating a sensitivity score for the object and comparing the sensitivity score to one or more thresholds to determine a sensitivity category for the object (e.g., low, medium, or high sensitivity).

Assuming the malware protection module 260 determines 530 that the cloud storage object should be protected, the cloud storage object is replicated 540 across other cloud storage platforms 130. The extent to which the cloud storage object is replicated may depend on the sensitivity category for the cloud storage object (where one was determined). For example, as described previously, a highly sensitive object may be replicated 540 across all available cloud storage platforms 130 (with potentially more than one copy per cloud storage platform) to minimize the risk of significant disruption in the event of a ransomware attack. Conversely, a less sensitive object might be replicated 540 to just one other cloud storage platform 130 (or not at all).

Computing System Architecture

Figure 6:
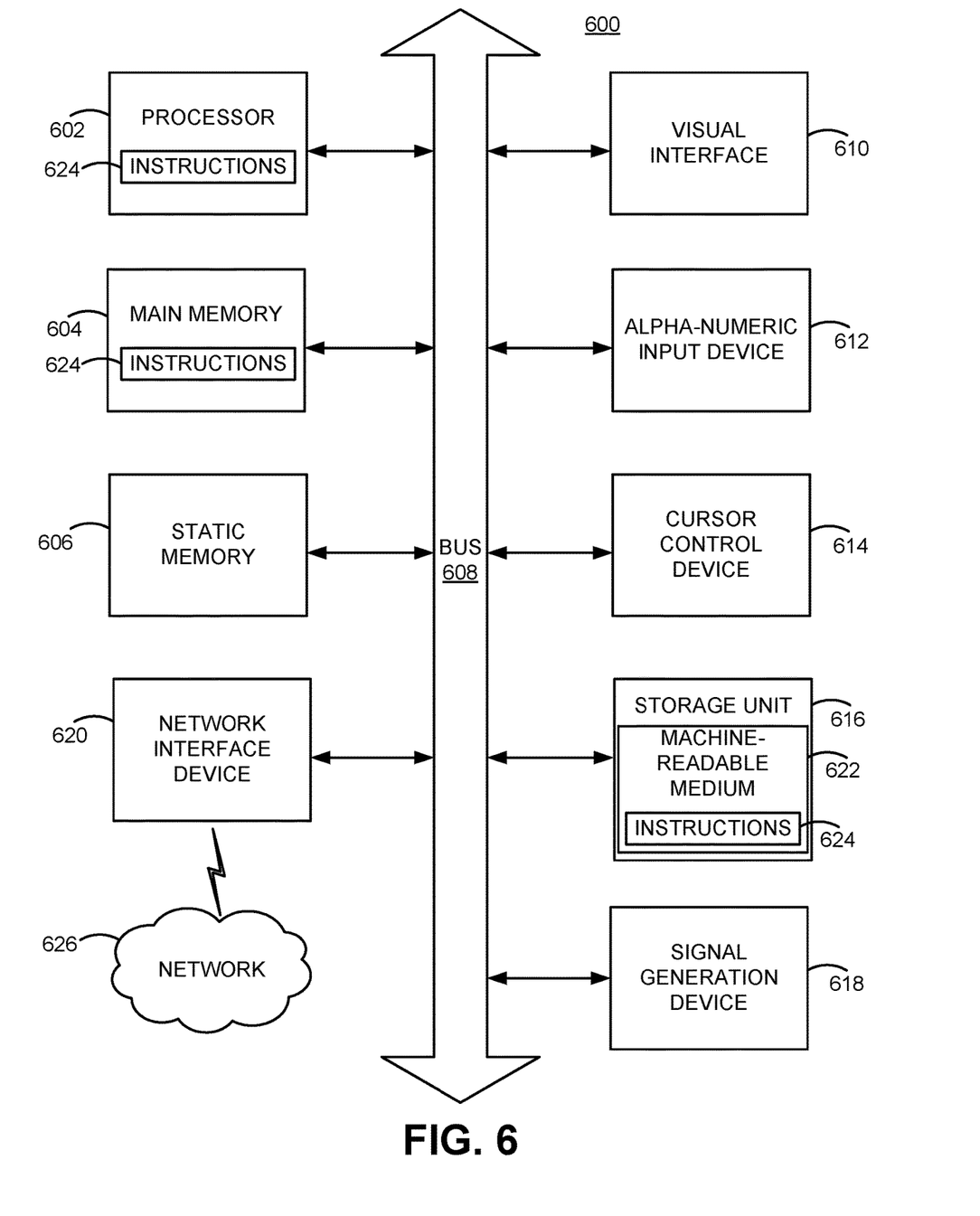
FIG. 6 is a block diagram illustrating components of an example machine able to read instructions from a machine-readable medium and execute them in a processor (or controller), according to an embodiment.

FIG. 6 is a block diagram illustrating components of an example machine able to read instructions from a machine-readable medium and execute them in a processor (or controller), according to an embodiment. Specifically, FIG. 6 shows a diagrammatic representation of a machine in the example form of a computer system 600 within which program code (e.g., software) for causing the machine to perform any one or more of the methodologies discussed herein may be executed. The program code may be comprised of instructions 624 executable by one or more processors 602. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a tablet, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include visual display interface 610. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 610 may include or may interface with a touch enabled screen. The computer system 600 may also include alpha-numeric input device 612 (e.g., a keyboard or touch screen keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 416 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media can.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for systems and processes for providing security for cloud-based storage objects. Thus, while particular embodiments and applications have been illustrated and described, it is to be understood that the described subject matter is not limited to the precise construction and components disclosed. The scope of protection should be limited only by the following claims.

What is claimed is:

1. A non-transitory computer-readable medium including stored instructions, the instructions, when executed by a computing system, causing the computing system to perform operations comprising:
    obtaining scan results indicating a cloud storage object from a cloud storage platform is safe;
    obtaining attributes of the cloud storage object;
    determining, based on the attributes of the cloud storage object, to secure the cloud storage object against ransomware attacks, wherein determining to secure the cloud storage object against ransomware attacks comprises:
        calculating a significance score of the cloud storage object using the attributes of the cloud storage object;
        comparing the significance score to a threshold; and
        determining to secure the cloud storage object against ransomware attacks responsive to the significance score exceeding the threshold; and
    responsive to determining to secure the cloud storage object, replicating the cloud storage object to one or more additional cloud storage platforms.

2. The non-transitory computer-readable medium of claim 1, wherein obtaining the scan results comprises:
    downloading a copy of the cloud storage object from the cloud storage platform; and
    scanning the copy of the cloud storage object using a platform-agnostic scanner to generate the scan results.

3. The non-transitory computer-readable medium of claim 1, wherein the attributes of the cloud storage object include one or more of a size, frequency of access, total number of accesses, time since last use, frequency of edits, source, or storage location.

4. The non-transitory computer-readable medium of claim 1, wherein determining to secure the cloud storage object against ransomware attacks comprises:
    classifying the cloud storage object into a significance category of a plurality of significance categories using the attributes of the cloud storage object; and
    determining to secure the cloud storage object against ransomware attacks based on the significance category.

5. The non-transitory computer-readable medium of claim 4, wherein the cloud storage object is replicated to a greater number of additional cloud storage platforms than a second cloud storage object that is classified into a lower significance category than the significance category of the cloud storage object.

6. The non-transitory computer-readable medium of claim 1, wherein replicating the cloud storage object to one or more additional cloud storage platforms comprises storing a copy of the cloud storage object in all available cloud storage platforms.

7. The non-transitory computer-readable medium of claim 1, wherein the operations further comprise:
    receiving, from the cloud storage platform, an event identifying the cloud storage object;
    determining, using the event, to scan the cloud storage object;
    responsive to determining to scan the cloud storage object, downloading a copy of the cloud storage object from the cloud storage platform;
    scanning the copy of the cloud storage object using a platform-agnostic scanner to generate the scan results; and
    providing instructions to the cloud storage platform to unlock the cloud storage object responsive to the scan results indicating that the cloud storage object is safe.

8. A method comprising:
    obtaining scan results indicating a cloud storage object from a cloud storage platform is safe;
    obtaining attributes of the cloud storage object;
    determining, based on the attributes of the cloud storage object, to secure the cloud storage object against ransomware attacks, wherein determining to secure the cloud storage object against ransomware attacks comprises:
        calculating a significance score of the cloud storage object using the attributes of the cloud storage object;
        comparing the significance score to a threshold; and
        determining to secure the cloud storage object against ransomware attacks responsive to the significance score exceeding the threshold; and
    responsive to determining to secure the cloud storage object, replicating the cloud storage object to one or more additional cloud storage platforms.

9. The method of claim 8, wherein obtaining the scan results comprises:
    downloading a copy of the cloud storage object from the cloud storage platform; and
    scanning the copy of the cloud storage object using a platform-agnostic scanner to generate the scan results.

10. The method of claim 8, wherein the attributes of the cloud storage object include one or more of a size, frequency of access, total number of accesses, time since last use, frequency of edits, source, or storage location.

11. The method of claim 8, wherein determining to secure the cloud storage object against ransomware attacks comprises:
classifying the cloud storage object into a significance category of a plurality of significance categories using the attributes of the cloud storage object; and
determining to secure the cloud storage object against ransomware attacks based on the significance category.

12. The method of claim 11, wherein the cloud storage object is replicated to a greater number of additional cloud storage platforms than a second cloud storage object that is classified into a lower significance category than the significance category of the cloud storage object.

13. The method of claim 8, wherein replicating the cloud storage object to one or more additional cloud storage platforms comprises storing a copy of the cloud storage object in all available cloud storage platforms.

14. The method of claim 8, further comprising:
receiving, from the cloud storage platform, an event identifying the cloud storage object;
determining, using the event, to scan the cloud storage object;
responsive to determining to scan the cloud storage object, downloading a copy of the cloud storage object from the cloud storage platform;
scanning the copy of the cloud storage object using a platform-agnostic scanner to generate the scan results; and
providing instructions to the cloud storage platform to unlock the cloud storage object responsive to the scan results indicating that the cloud storage object is safe.

15. A cloud storage security system comprising:
a processor; and
a non-transitory computer-readable medium including instructions that, when executed by the processor, cause the cloud storage security system to perform operations comprising:
obtaining scan results indicating a cloud storage object from a cloud storage platform is safe;
obtaining attributes of the cloud storage object;
determining, based on the attributes of the cloud storage object, to secure the cloud storage object against ransomware attacks, wherein determining to secure the cloud storage object against ransomware attacks comprises:
calculating a significance score of the cloud storage object using the attributes of the cloud storage object;
comparing the significance score to a threshold; and
determining to secure the cloud storage object against ransomware attacks responsive to the significance score exceeding the threshold; and
responsive to determining to secure the cloud storage object, replicating the cloud storage object to one or more additional cloud storage platforms.

16. The cloud storage security system of claim 15, wherein determining to secure the cloud storage object against ransomware attacks comprises:
classifying the cloud storage object into a significance category of a plurality of significance categories using the attributes of the cloud storage object; and
determining to secure the cloud storage object against ransomware attacks based on the significance category,
wherein the cloud storage object is replicated to a greater number of additional cloud storage platforms than a second cloud storage object that is classified into a lower significance category than the significance category of the cloud storage object.

17. The cloud storage security system of claim 15, wherein the operations further comprise:
receiving, from the cloud storage platform, an event identifying the cloud storage object;
determining, using the event, to scan the cloud storage object;
responsive to determining to scan the cloud storage object, downloading a copy of the cloud storage object from the cloud storage platform;
scanning the copy of the cloud storage object using a platform-agnostic scanner to generate the scan results; and
providing instructions to the cloud storage platform to unlock the cloud storage object responsive to the scan results indicating that the cloud storage object is safe.

\* \* \* \* \*